Aug. 15, 1961  S. E. BORG  2,995,940
DAMPING DEVICE
Filed June 24, 1958  4 Sheets-Sheet 1

INVENTOR.
S. EDWARD BORG
BY Kenway, Jenney,
Witter + Hildreth
ATTORNEYS

Aug. 15, 1961  S. E. BORG  2,995,940
DAMPING DEVICE
Filed June 24, 1958  4 Sheets-Sheet 4

INVENTOR.
S. EDWARD BORG
BY Kenway, Jenney,
Witter + Hildreth
ATTORNEYS

United States Patent Office 2,995,940
Patented Aug. 15, 1961

2,995,940
DAMPING DEVICE
Sune Edward Borg, Westwood, Mass., assignor, by mesne assignments, to Northrop Corporation, Beverly Hills, Calif., a corporation of California
Filed June 24, 1958, Ser. No. 744,224
3 Claims. (Cl. 74—5.5)

This invention relates to a damping device and compries an improvement in the construction and operation of a device for providing fluid damping automatically compensated for variations in the viscosity of the damping medium.

In one aspect the present invention constitutes an improvement upon a damping device of the sort disclosed in the co-pending application of Haagens and Swainson, Serial No. 629,850 filed December 21, 1956, now United States Letters Patent No. 2,864,256 issued December 16, 1958.

Many precision instruments require damping in order to perform accurately, particularly gyroscopes, accelerometers, and the like wherein the movement of masses is utilized to measure velocity and other functions. A good example of the problem is found in the field of gyroscopes mounted within housings filled with oil or other liquid.

The presence of the liquid within the housing obviously makes it desirable to utilize a liquid damping system, and several different types have been developed, usually including vanes or blades attached to the moving mass and operating against the resistance offered by the liquid. Various combinations of valve-controlled passages and interconnected chambers have been developed in order to provide means for varying the amount of damping in controlled fashion.

The most perplexing problem encountered is that which arises from the fact that the viscosity of fluids, such as silicone oils, varies with changes in ambient temperature. In the absence of means responsive to temperature changes for varying the amount of damping, the damping force will be found to be very high at low temperatures and to fall off rapidly with an increase in temperature, through a curve of non-linear configuration. Therefore in order to provide a system in which the damping force is constant it is necessary to make use of means for introducing into the system a controlled damping force which varies in the opposite direction to the variation of the natural damping force and through a curve which is the reciprocal of the curve of variation of the natural damping force, the result being that for all temperatures the sum of the "natural" damping force and the controlled damping force will be the same.

The application of Haagens and Swainson provides such a system and generally describes a damping system for an instrument, such as a gyroscope, responsive to the movement of a mass wherein the total damping force of the system is substantially constant over the range of temperature normally to be encountered in use. The damping system comprised a container including walls providing passages for damping fluid in combination with a plurality of vanes mounted for frictionless movement in the damping fluid, and a plurality of sliding gates movable to vary the effective volume of the fluid passages and thereby controlling the damping force, the position of the gates being responsive to a temperature or volume change of the liquid. There was also a plunger having a bearing surface cooperating with cam surfaces on the gates, and temperature or volume responsive means for reciprocating the plunger in order to vary the position of the sliding gates.

While the device as disclosed in said application is satisfactory in operation, in making very small units it has been found difficult to machine the cam surfaces of the gates with sufficient accuracy, particularly in the area where the gate movement is relatively great in response to movement of the actuating plunger. As previously stated, in plotting the natural damping curve of the damping fluid over a broad temperature span it was found that, as the temperature rises, the curve drops very sharply at first and then levels off in the medium and high temperature ranges. Interpreted, this of course means that the natural damping resistance offered by the fluid is relatively great at low temperatures but decreases sharply as the temperature starts to rise. To compensate for this there must be a greater initial movement of the gate in the lower temperature ranges than at the higher temperatures, keeping in mind that the size of the orifice formed by the slidable gates and the walls controls the amount of imposed damping. Since the gates act in direct response to the plunger it has been found difficult to bring about smoothly and accurately this greater initial movement of the gates per increment of plunger movement because of the obliqueness of the angle of actuation at the low temperature area of contact.

Therefore it is an object of this invention to provide a damping system wherein changes in temperature causing changes in the damping force of the damping fluid are compensated for smoothly and accurately so that the total damping force remains substantially constant over a broad temperature span.

Another object of this invention is to provide a means in the type of damping system described, whereby the problem of profiling the gates according to the damping curve of the fluid is avoided.

An important feature of the invention resides in a pivoted multiple acting member, which may conveniently be termed a lever, interposed between the cam surface of the plunger and the vertical inner end of the sliding gate, the lever providing means by which through proper profiling, the extent of incremental movements of the gate may easily be varied in response to equal increments of movement of the plunger.

From the use of such a combination of gate, lever, and plunger certain other advantages and improvements are realized, for example, the gates will be actuated by forces parallel to their direction of movement rather than at right angles as previously, thus reducing stress concentration at the point of actuation and lessening wear upon moving parts. It is possible that the gates may be formed circular in cross-section which would facilitate improvement of the surface finish of both the gate and its guideway by permitting the use of lapping and honing operations.

These and other objects and features of the invention will be more readily understood and appreciated from the following detailed description of a preferred embodiment thereof selected for purposes of illustration and shown in the accompanying drawing in which.

Figure 1:
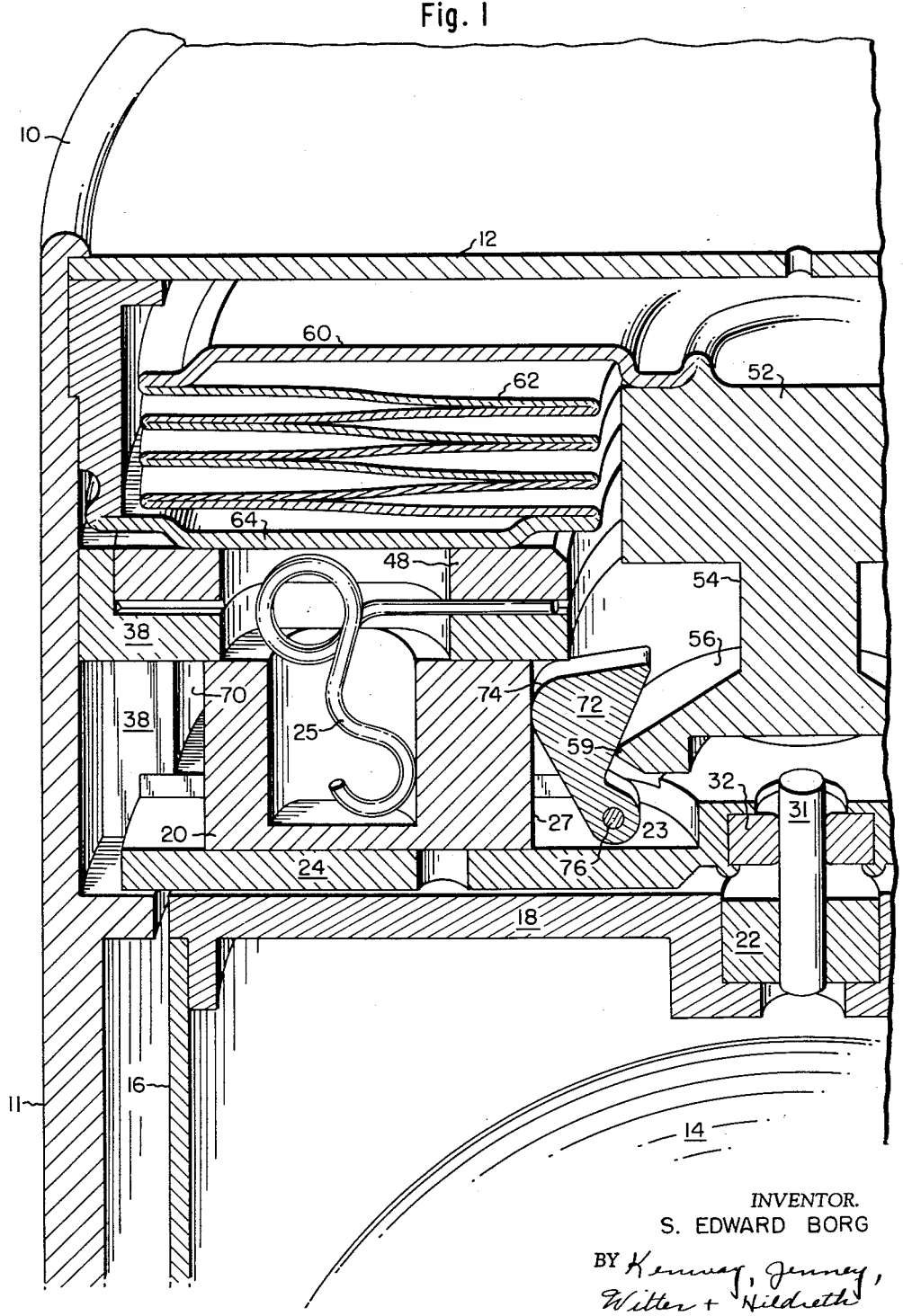
FIG. 1 is a sectional view in perspective showing most of the essential components of the complete apparatus.

For purposes of discussion we shall describe the damping device as incorporated into a gyroscope assembly although it is to be understood that the invention is not limited to use in any one type of instrument.

The gyroscope and damping system are contained within a cylindrical metal casing 11, one end of which is closed by an annular flat metal plate 12, secured about its periphery by a bead or rolled edge 10.

The components of the gyroscope include a motor assembly 14 and an enveloping gimbal structure 16 including an inner cylindrical casing terminating at its upper end in an annular flat metal plate 18, provided at its center with a bushing 22 carrying a pivot pin 31 concentric with the casing. Projecting upward from the plate 18 are four wedge-shaped, radially and symmetrically disposed vanes 30, 30a, 30b, and 30c which rotate in a narrow arc in response to the action of the gyroscope. An annular flat disc 24 overlies the plate 18 and is provided with four slots 26 which embrace the vanes 30 with sufficient clearance to permit limited relative rotation of the vanes 30 and the plate 18. The disc 24 carries a bearing 32 in which the pin 31 turns and upon the disc 24 are formed four symmetrically disposed shallow guideways 23, each extending radially outward between the slots 26. Gates 20, 20a, 20b, and 20c are slidably mounted in the guideways 23 and each are provided with a spring 25, secured in an overhanging washer 48, to urge the gate towards the center of the disc 24.

It should be pointed out that while there are four or more gates 20 in the complete apparatus, the description shall be limited to only one since all are identical in form and operation.

Disposed above and around the gate 20 and the disc 24 is a member 38 comprising an annular plate having a peripheral depending flange slotted at four places to correspond with the guideway 23 to cooperate with the upper portion of the gate 20 so that the gate 20 is contained both at top and bottom in a radial guideway. The vanes 30 form with the member 38 four chambers, each of which is divided in two by one of the gates 20, the two parts of each chamber communicating through a passage or orifice 70, formed by the outer ends of the gate 20 and the slots formed in the flange of the member 38. Thus the gate 20, being a slidable partition in the chamber, acts as a gate valve and the radial position of each gate determines the area of the passage 70 between the adjacent parts of the chambers which of course determines the amount of resistance offered to the flow of the fluid between the two parts of each chamber and thereby controls the amount of imposed damping.

Extending downward through the washer 48 and the member 38 is a vertical plunger 52 having a reduced shank portion 54 and a lower mushroom-shaped head having a smoothly rounded outer periphery 59, engaging four generally delta-shaped levers or double acting cams 72, 72a, 72b, and 72c (only one of which will be described), pivoted about a pin 76 mounted in holes 80 formed in the vertical sides of the guideways 23. The lever 72 is provided with a cam surface 74 opposite an actuating surface 78, and in assembly the lever 72 is positioned between the mushroom-shaped head 56 of the plunger 52 and the gate 20 in such a manner that the rounded outer periphery 59 of the head 56 engages and bears against the actuating surface 78 of the lever 72; the cam surface 74 of the lever 72 engages and bears against the vertical inner end 27 of the gate 20, pressure contact being maintained among the various members by the force of the spring 25.

At its upper end the plunger 52 is secured to an annular plate 60 serving as the upper member of a cylindrical flexible bellows 62 which conforms in volume to the volume of the fluid within it. As the temperature of the damping fluid within the apparatus increases it expands in volume thereby expanding the bellows, thus causing the plunger 52 to move upward and the gates 20 to move radially outward by the operation of the plunger 52 in cooperation with the lever 72. In consequence the area of the passage 70, through which the damping fluid flows in response to the rotation of the vanes 30, is reduced. The cam surface 74 of the lever 72 is profiled so that as it is pivoted by the reciprocal motion of the plunger 52, it will move the gate 20 and thus valve the passage 70 in a manner that achieves a constant total damping force at all temperatures.

A full understanding of the design, use, and operation of the lever 72 will disclose that it is not simply a lever but more properly is a multiple acting member, because of the various functions it performs. As a matter of convenience the member 72 is termed a lever, in view of the fact that it transmits and multiplies the movement of the plunger 52, although it should be clear that a number of other terms might have been equally as well chosen. The member 72 is also a cam follower vis-a-vis the plunger 52 and a cam vis-a-vis the gate 20, since it moves the gate 20 at a rate determined by the cam surface 74 of the lever 72 as it bears on the inner end 27 of the gate 20.

The invention herein disclosed and claimed does not lie solely in the interposition of a multiple acting member or lever 72 between the plunger 52 and the gate 20 but rather in the combination of a reciprocating plunger, a gate reciprocal in a direction inclined from that of the plunger, and an actuating member following the plunger movement, operating the gate, and modulating the nature of the movement by a combination of the multiplying effect of the lever and the contours of the cam surfaces.

Figure 2:
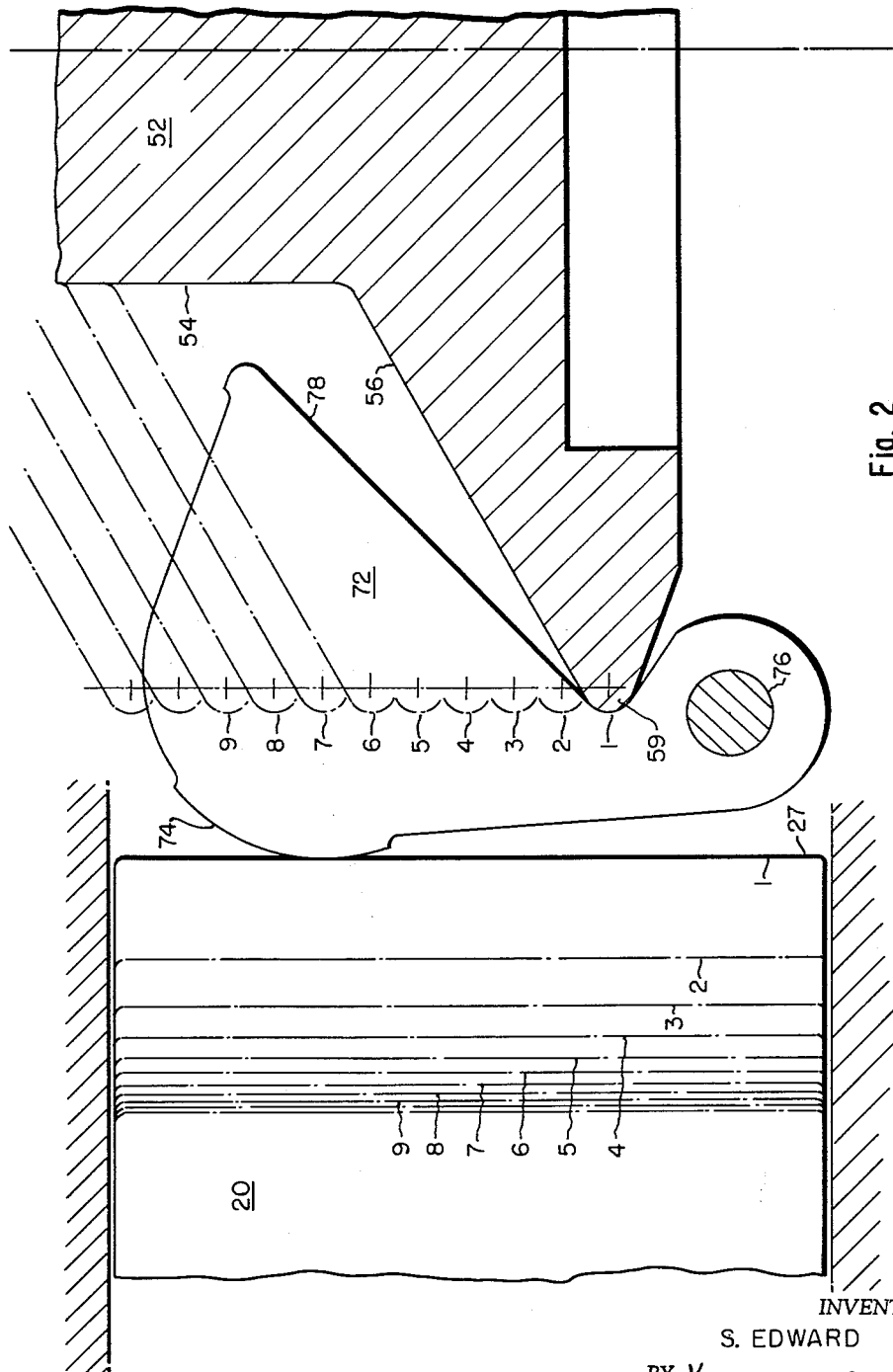
FIG. 2 is a diagrammatic view of the actuating lever and portions of the plunger and gate, wherein the plunger and gate are shown in successive positions.

The operation of the lever 72 and its relation to the plunger 52 and the gate 20 is shown in FIG. 2 wherein the successive positions of the plunger 52 and the gate 20 are indicated by corresponding numbers. It will be appreciated that the primary display of the parts indicated as position 1 on the plunger 51 and 1 on the gate 20 is the "cold" position of the device and provides the minimum amount of imposed damping since the plunger 52 is at its lowest position and the gate 20 fully open. As the temperature of the damping fluid rises, the plunger 52 will rise to position 2 because of the expansion of the fluid within the bellows 62. By the action of the outer periphery 59 bearing against the actuating surface 78, the rise will cause the lever 72 to pivot about the pin 76 and thus move the gate 20 into position 2 thereby increasing the damping force by throttling the passage 70. As the temperature continues to rise the plunger 52 will move upward to position 3 and correspondingly the lever 72 will incline further and gate 20 will be moved to position 3.

It will now be observed that the distances between positions 1 and 2 and between 2 and 3 of the plunger are equal whereas on the gate 20 the distance between positions 1 and 2 is greater than the distance between positions 2 and 3. Accordingly the distance between successive numbered positions of the plunger 52 remains constant whereas the distance between successive numbered positions of the gate 20 decreases as the plunger 52 rises, and the lever 72 inclines further with the gate 20 moved correspondingly outward. This motion is a result of the contour of the cam lever 72. It will, of course, be understood that the parts may assume any intermediate corresponding position, the numbered positions shown here being only for purposes of illustration.

Again, as the plunger 52 rises from position 3 to 4, a distance that is constant, the gate 20 moves from position 3 to 4 a distance that is less than the distance 2 to 3 on the gate, which, in turn, is less than the distance 1 to 2. Thus throughout the full temperature rise the gate movement decreases although the plunger movement remains constant. By profiling the cam surface 74 to correspond to the curve of the viscosity of the damping fluid a constant total damping force is achieved.

Figure 4:
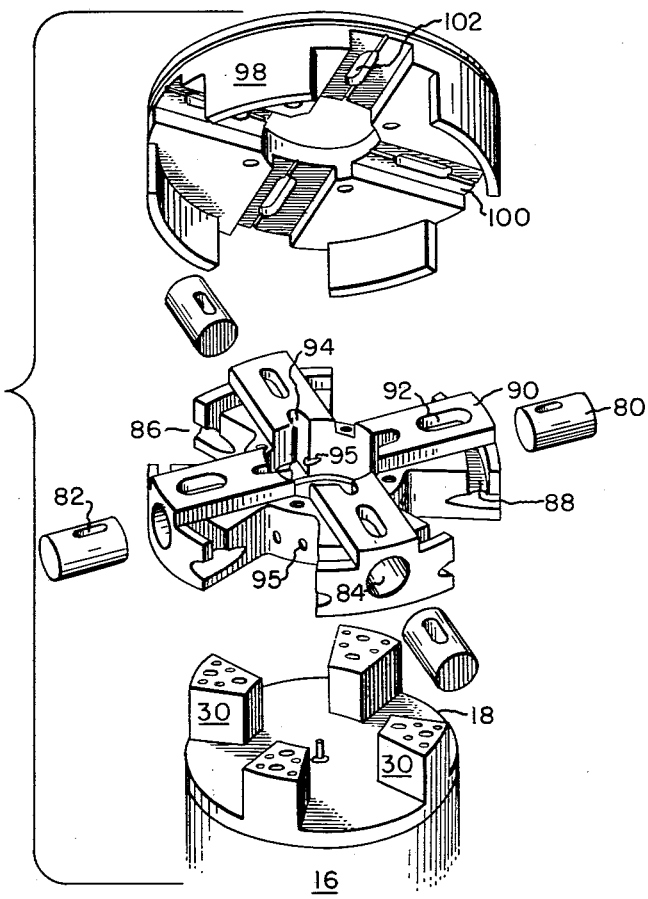
FIG. 4 is an exploded view in perspective of a modification of my device.
Figure 5:
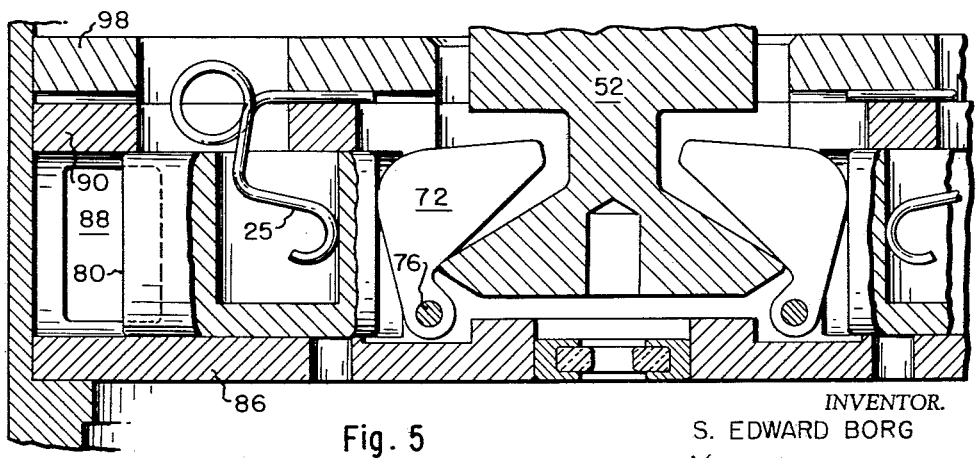
FIG. 5 is a sectional view of the modification.

In FIGS. 4 and 5 there is shown a modification of my invention in which the gates are circular in cross-section and reciprocated in a one piece, machined block.

In this modification the gimbal structure 16 and the annular flat metal plate 18 with the upwardly projecting vanes 30 remains in the same form as previously described.

Figure 3:
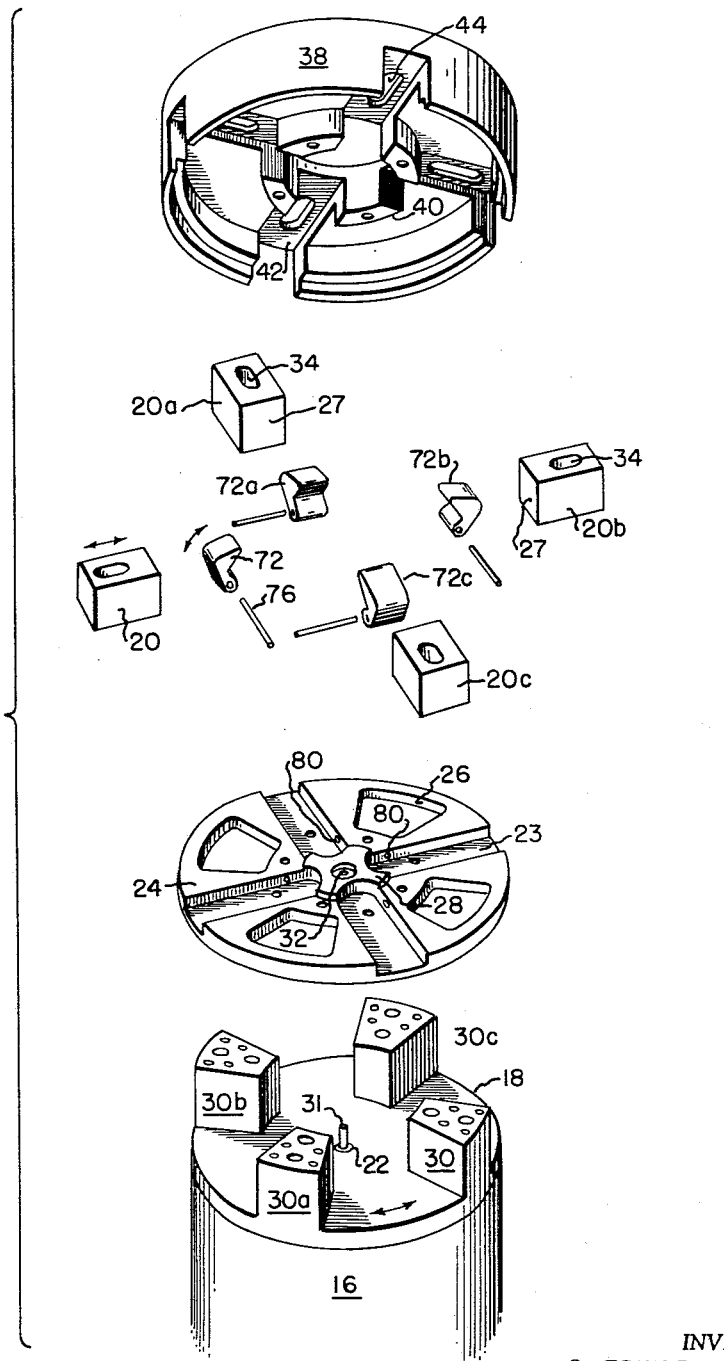
FIG. 3 is an exploded vew in perspective of the most essential parts of a damping device constructed in accordance with the invention.

The gates 80 in this embodiment are circular in cross-section and function in the same manner as the gates 20 of FIGS. 1, 2 and 3. The gates are provided with slots 82 to receive the springs 25, and in this instance the gates are slidably mounted in a hole 84 bored in a block indicated generally by the reference character 86. The block is of one piece having four radial segments, each with a hole 84, a peripherally grooved passageway 88 (corresponding to passageway 70 of FIG. 1) intersecting the hole 84, and a raised portion 90 into which the slot 92 is bored to receive one end of the spring 25.

At the inner end of the hole 84 there is formed an elongated vertical opening 94 into which the delta-shaped cam 72 is pivotally received and mounted on pin 76. A hole 95 is drilled horizontally through the block and through a section of the elongated vertical opening 94 in order that pivot pin 76 may be inserted. It will be noted that portions of the radial segments of the block 86 have been removed to allow drilling of the holes 95. The block itself overlays the plate 18 in much the same manner as the disc 24 in the first embodiment of my invention.

Surmounting the block 86 is a member 98 with a depending flange, somewhat similar in structure to the member 38 of FIGS. 1 and 3. It is provided with slots 102 to receive a portion of the spring 25 and with radial recesses 100 to cooperate with the raised portion 90 of the block 86.

It will of course be understood that function, operation, and relation of the gates, cams, and plunger remain unchanged in the modification although the mounting and shape of some of the parts are in some instances altered.

The invention is not to be limited by the above description but is intended to include such variations as would appear to those skilled in the art. For instance, it may be desirable, if the damping curve of the fluid requires it, to shape the lever 72 so that the corresponding distances between successive positions of the gate 20 increase rather than decrease while the distances between successive positions of the plunger 52 remain constant. Numerous other motions of the gate 20 may be obtained by changing the profile of the lever 72.

It will, of course, be understood that various details of construction may be varied through a wide range without departing from the principles of this invention and it is therefore not the purpose to limit the patent granted hereon otherwise than necessitated by the scope of the appended claims.

Having thus disclosed my invention, what I claim as new and desire to secure by Letters Patent of the United States is:

1. In a constant damping device for a movable mass including a cylindrical casing, a plate disposed within the casing for rotation about the long axis thereof, a plurality of damper vanes mounted on said plate in radial array, a radially movable gate disposed between each pair of damper vanes within the casing, walls within the casing surrounding but not touching the damper vanes and forming chambers between each pair of vanes and fluid passages regulated by the gates, the gates serving as slidable partitions dividing each chamber in two, fluid filling said casing, a temperature sensitive element having a plunger, and means connecting said plunger to said radially slidable gates to vary the size of said fluid passages with changes in temperature; said means comprising a lever pivotally supported in said casing and disposed between said plunger and said gate, one side of said lever engaging a cam surface on the end of said plunger, another side of said lever engaging the inner end of said gate.

2. In a fluid damping system of the class described wherein a constant damping force is maintained for an instrument having a rotatable gimbal enclosed in a casing, a plurality of vanes attached to said gimbal, a like plurality of gates radially slidable in said casing and interposed between said vanes, the outermost ends of said gates defining with the inner wall of said casing openings of variable size, an expansible bellows sealed to said casing and communicating with the interior thereof, a damping fluid substantially filling said casing and said bellows, a plunger having a cam base attached to said bellows, changes in temperature causing volumetric changes in said fluid and changes in the size of said bellows, said plunger being moved by said bellows; in combination with means for said plunger to actuate said gates, said means comprising a lever pivotally mounted between said plunger and a gate, one side of said lever being formed with a cam surface engaging the inner face of said gate and another side of said lever engaging with the cam base of said plunger.

3. In a fluid damping device wherein the fluid passes through an orifice variable according to the temperature of the damping fluid through the action of an expansible temperature-volume sensitive bellows having a plunger having a cam surface, a gate that valves said orifice; a lever pivotally mounted between and in contact with both said gate and said plunger, the cam surface of the plunger and the adjoining surface of the lever being profiled so that movement of the lever in response to movement of the plunger effects non-linear movement of the gate.

References Cited in the file of this patent
UNITED STATES PATENTS 2,834,213    Fredericks _____ May 13, 1958

FOREIGN PATENTS 393,061    Great Britain _____ June 1, 1933